J. W. R. LAXTON.
VALVE.
APPLICATION FILED MAR. 11, 1910.
1,014,070.
Patented Jan. 9, 1912.
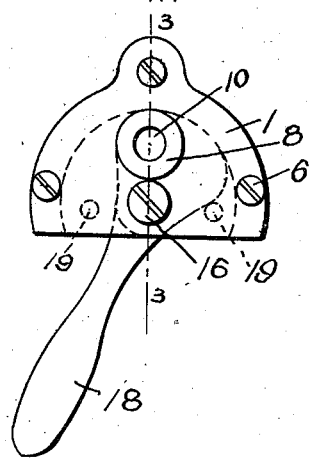
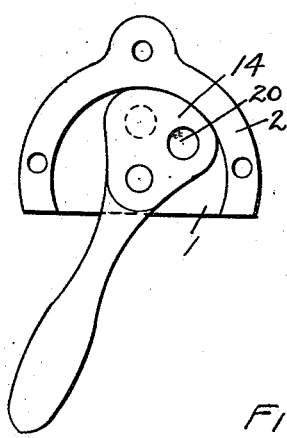
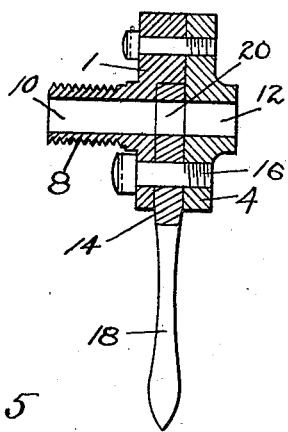
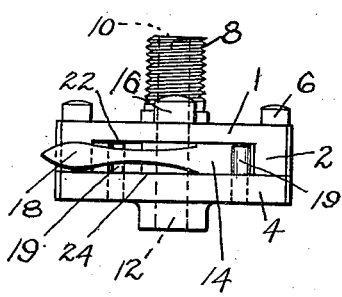
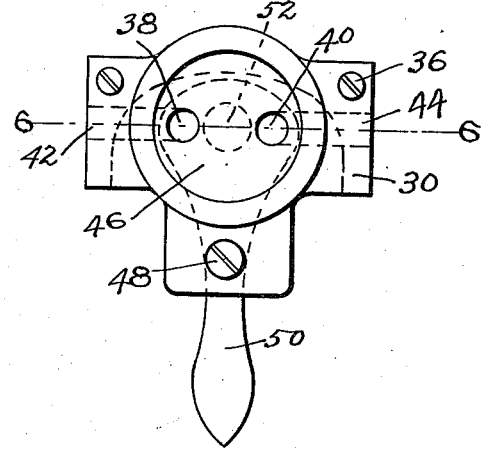
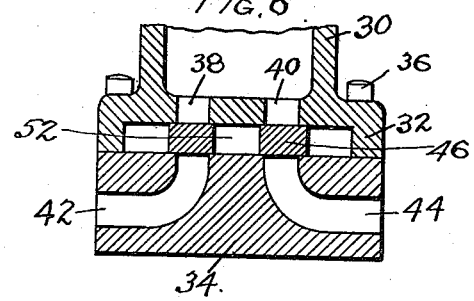
WITNESSES
Mary C. Connelly
Carrie A. Mulock
INVENTOR
John W. R. Laxton.
by his attorney
William J. Sperl.
COLUMBIA PLANOGRAPH CO., WASHINGTON, D. C.

UNITED STATES PATENT OFFICE.

JOHN W. R. LAXTON, OF LYNN, MASSACHUSETTS.

VALVE.

1,014,070.  Specification of Letters Patent.  Patented Jan. 9, 1912.

Application filed March 11, 1910. Serial No. 548,728.

*To all whom it may concern:*

Be it known that I, JOHN W. R. LAXTON, of Lynn, in the county of Essex and State of Massachusetts, have invented certain new and useful Improvements in Valves, of which the following is a specification.

This invention relates to valves and more particularly to valves having a swinging gate.

The object of the invention is to provide an improved form of valve construction which is economical in the cost of manufacture and maintenance, and one which is adapted for use where a large amount of gritty matter is passed through the valve, yet which provides a tight joint when closed.

With the above object in view a feature of the invention contemplates the provision of a valve having a pivoted plate provided with an aperture, and adapted to co-act with substantially parallel seat surfaces, one on each side of the plate, and means for holding the seats tightly against the plate to make a tight joint therewith, the seat surfaces being protected by the valve body from coming in contact with the matter passing through the valve, thus preventing the erosion of the seat surfaces and maintaining a tight joint.

A further feature of the invention contemplates the provision of a valve casing having a plurality of inlet and discharge passages and a pivoted valve plate provided with an aperture adapted to be brought into communication with either of said passages, said plate being held between two substantially parallel seat surfaces on the valve casing, and means for maintaining the seat surfaces tightly in contact with the valve body.

Other features of the invention will be referred to in connection with the specific description of the illustrated embodiment of the invention.

The several features of the invention will be clearly understood from an inspection of the accompanying drawing and the following detailed description of the construction shown therein.

In the accompanying drawing Figure 1 is a top plan view of one form of the valve complete and in open position; Fig. 2 is a bottom plan view of a portion of the valve casing, and the valve body in closed position; Fig. 3 is a vertical section taken on the line 3—3 in Fig. 1; Fig. 4 is a front elevation; Fig. 5 is a top plan view of a modified form of valve; and Fig. 6 is a central vertical section taken on the line 6—6 in Fig. 5.

As shown in Figs. 1 to 4 inclusive, of the drawing, the valve comprises a casing composed of a top plate 1 having a dependent semi-circular flange 2, and a bottom plate 4, which is secured against the flange by means of screws 6. An externally threaded nipple 8 projects upwardly from the top plate 1, by means of which the valve may be connected to a pipe or other support. A passage 10 extends through the nipple and the top plate and is in alinement with a passage 12 of the same diameter in the bottom plate 4. A sector-shaped valve body or plate 14 is pivotally held between the top and bottom plates 1 and 4 by means of a screw 16 and is provided with a handle 18, by means of which it may be tilted. Stop pins 19 mounted in the bottom plate 4 limit the throw of the valve body 14 into the wide open and closed positions, respectively. An aperture 20 of the same diameter as the passages 10 and 12 extends through the valve body 14, and when brought into register with the said passages a smooth straight-away passage is provided which is free from obstructions or recesses which would hold solid matter passing through the valve. The inner surfaces 22 and 24 of the plates 1 and 4 respectively are finished to form seat surfaces, and the depth of the flange 2 is substantially the same as the thickness of the valve plate 14, so that when the bottom plate 4 is secured in position the seat surfaces 22 and 24 are held tightly against the valve body.

As shown in Figs. 5 and 6 the valve casing comprises a top member 30 having a dependent flange 32, and a bottom member 34 secured against the flange by screws 36. The top member 30 is provided with two inlet passages 38 and 40 which are in alinement with the inner ends of the discharge passages 42 and 44 respectively, formed in the bottom member 34. A sector shaped valve body or plate 46 is pivotally mounted between the top and bottom members of the valve casing by means of a screw 48 which also aids in holding the casing members together, said valve body having a handle 50 by means of which it may be tilted. The valve body 46 is provided with a hole 52 which may be brought into communication with either of the passages 38 or 40 so that the contents may be discharged through the passages 42 or 44. In the present instance the diameter of the hole 52 is somewhat larger than that of the passages 38 and 40, so that when the handle 50 is in its middle position both passages are closed, and when swung to either side to open the valve the full effective area of said passages may be utilized.

It will be noted from the construction above set forth that the seat surfaces are protected by the valve body so that none of the material which passes through the valve comes in contact with said surfaces, thus eliminating the erosion which would take place if the seats were exposed to the action of said material when the valve is open. The parts may be readily dismantled and re-surfaced, since the bearing surfaces are all flat. The valve casing and body may be made entirely of brass or bronze, or the casing may be made of cast-iron and be provided with non-corrodible seat surfaces. The valve is particularly adapted for use in mining machinery where finely ground ore is passed through the valves yet which valves must be tight in order to retain mercury which is used in certain amalgamation processes. It may be noted however that the valve is also adapted to be used in other localities.

While I have illustrated and described a preferred embodiment of the invention, I am aware that many modifications can be made therein by any person skilled in the art without departing from the scope of the invention as expressed in the claims. Therefore I do not wish to be limited to all the details of construction shown and described therein, but

What I claim is:—

1. A valve, comprising a casing composed of a top and a bottom member each provided with a passage, one of said members being provided with a flange and forming with the other of said members a substantially semi-circular chamber having an opening at one side, flat substantially parallel seat surfaces on said members, a valve plate pivotally mounted within said casing and having a handle projecting through said opening, said valve plate being provided with an aperture and having substantially parallel flat surfaces adapted to coact with said seat surfaces, said valve plate being also arranged to protect said seat surfaces from contact with the material passing through the valve, substantially as described.

2. In a valve, the combination of a casing composed of a top and a bottom member each having a plurality of passages therein, a pair of substantially parallel flat seat surfaces within the casing, a valve body pivotally mounted to swing between said surfaces and provided with an aperture adapted to be placed in communication with either of said passages, and means for holding said seat surfaces in contact with said valve body, said valve body sliding over said seat surfaces and protecting them from contact with the material passing through the valve, substantially as described.

In testimony whereof I have affixed my signature, in presence of two witnesses.

JOHN W. R. LAXTON.

Witnesses:
  ROBERT FINLAY MILLER,
  WILLIAM J. SPERL.

---

Copies of this patent may be obtained for five cents each, by addressing the "Commissioner of Patents, Washington, D. C."